United States Patent [19]
Pocholle et al.

[11] Patent Number: 5,243,617
[45] Date of Patent: Sep. 7, 1993

[54] HIGH ENERGY SOLID-STATE LASER

[75] Inventors: Jean-Paul Pocholle, Norville; Michel Papuchon, Villebon, both of France

[73] Assignee: Thomson - C S F, Puteaux, France

[21] Appl. No.: 813,698

[22] Filed: Dec. 27, 1991

[30] Foreign Application Priority Data
Dec. 28, 1990 [FR] France ................... 90 16431

[51] Int. Cl.⁵ ............................................ H01S 3/09
[52] U.S. Cl. ................................. 372/69; 372/33; 372/34; 372/6
[58] Field of Search ............... 372/69, 70, 33, 6, 34, 372/35

[56] References Cited

U.S. PATENT DOCUMENTS

| | | | |
|---|---|---|---|
| 4,713,882 | 12/1987 | Lee | 372/6 |
| 4,890,289 | 12/1989 | Basu et al. | 372/6 |
| 4,908,832 | 3/1990 | Baer | 372/70 |
| 4,922,502 | 5/1990 | Unternahrer et al. | |
| 5,048,027 | 9/1991 | Hughes et al. | 372/6 |

*Primary Examiner*—Léon Scott, Jr.
*Attorney, Agent, or Firm*—Oblon, Spivak, McClelland, Maier & Neustadt

[57] ABSTRACT

The invention relates to a high energy solid-state laser using a new optical pumping device, comprising optical fibers coupled to optical pumping sources of great power and to a laseing medium. The coupling surface through which optical pump energy is transmitted onto the laseing medium is displaced by motor for improved heat dissipation and selective coupling of the pump energy to various resonant cavities.

13 Claims, 5 Drawing Sheets

POPULATION INVERSION

HIGH ENERGY SOLID-STATE LASER

BACKGROUND OF THE INVENTION

1. Field of the Invention

This invention relates to the field of solid-state power lasers pumped by optical sources, such as laser diodes.

2. Description of Related Art

High energy laser beams are useful as an industrial lasers, laser weapons or as optical pumps of X-ray lasers.

Generally, the laser effect involves a stimulated emission corresponding to the release of photons. Photons are emitted when electrons fall to a lower energy state. Stimulated emission provides induced radiation which has the same phase as the inducing radiation. Stimulated emission radiation has the same propagation direction and polarization so that stimulated emission is identical to the inducing radiation. Therefore stimulated emission provides phase coherent light amplification.

Radiation transmitted into any given medium has a much greater probability of being absorbed than of causing stimulated emission. To generate stimulated emission, a population inversion must be induced in the medium. A population inversion is defined to be a state in which a selected set of equivalent energy levels are more populated than another set of equivalent but lower energy levels. A population inversion is caused by an outside excitation which is usually called pumping.

The laser amplifier is composed of an active material that can be stimulated by a pumping source to generate stimulated emission. If a laser amplifier is placed in a resonant cavity, the laser amplifier becomes a generator of intense radiation.

Solid-state lasers generally consist of glasses or crystals which are doped with ions. The positions of the ion energy levels are allow population inversion to occur. Optical pumping is possible in solid state lasers, in contrast with gas lasers which are pumped by electric discharge because of the low optical absorption coefficient gas lasers.

The active media of solid-state lasers may be ruby, which is transparent alumina crystal incorporating trivalent chromium ions.

The active media may also be neodymium glass doped with $Nd^{3+}$ ions or else yttrium-aluminum garnet (called YAG) also doped with $Nd^{3+}$ ions The neodymium and YAG, $Nd+3$ media have a low population inversion threshold. These media have provide stimulated emission due to an electronic energy level system with four energy levels. Radiative emission is promoted in these 4 level systems through nonradiative emission to a lower energy from the lower level associated with the radiation transition. Nonradiative emission of electrons from radiative ground state to a lower state allows population inversion to be easily obtained.

The main pumping sources for the aforementioned solid state lasers have been flash lamps. Flash lamps emit in many directions and in a wide spectral band. The effective pumping energy provided by flash lamps represents only a small part of the energy dissipated by the flash.

The pumping efficiency is improved when laser diodes which have spectral emission centered on the absorption band of the doping ion are used to pump the media.

However, for high energy (several kilowatt) solid-state lasers, it is essential to generate a very high pumping power and intensity (several tens of $kw/cm^2$).

Very high pumping power causes major heating problems. When laser diodes are used for pumping very high power lasers, excessive heating of the laser diodes and of the active solid material (laser media) occurs.

Conversion efficiency of electric energy into optical energy in laser diodes barely exceeds 40%. Conversion efficiency of optical pumping energy into radiative optical energy in the active material is barely greater than 30%. A considerable portion of the energy which is not converted into optical energy is absorbed and converted into heat in the active media.

Heat buildup limits the performance of such high power lasers. Therefore, providing a laser geometry which can conduct heat away from the active medium and choosing an active medium with high heat conductivity is very important. The material used for the active media must also exhibit low values of the thermal expansion coefficient and high thermal conductivity.

Low thermal expansion coefficients avoids stresses between the surface of and the center of the laser medium during when the laser medium is heated. Stresses result in the creation of irreversible defects (breaking of the material). Stresses also induces, through photoelastic interactions, inhomogeneous index of refraction changes in the medium.

A high thermal conductivity effectively dissipates heat from the center to the surface of the active laser medium and results in a lower temperature gradient and less stress in the active medium.

One solution to the heating problem has been to displace the rod constituting the solid active medium relative to a flash lamp thus promoting the evacuation of heat. However, any displacement of the rod may cause operating instabilities.

SUMMARY OF THE INVENTION

The present invention provides a novel device for optical pumping of a high energy solid-state laser. This device comprises optical fibers connected to high power optical pumping sources and to the solid active medium. The coupling surface is only a part of the outer surface of the laser and can be displaced in front of this part of the outer surface because of the flexibility of the mobile optical fibers.

The use of optical fibers which can convey pumping energy allows the optical pumping sources to be remote from the solid-state laser. Because of the separation of the pump and the laser media, the cooling devices associated with these two elements can also be spatially separated thereby avoiding problems associated with proximity of the cooling devices.

The invention makes possible one or more compact pumping sources for a laser and pumping sources that can be mechanically moved relative to the surface of the solid-state laser that must be excited. This mechanical movement is a function of time. The evacuation of heat from the solid-state laser is promoted by the displacement of the pumping source or sources and reinforced by the circulation of a heat-exchanging flow around the laser. These optical pumping sources preferably consist of laser diodes able to deliver very high optical powers.

BRIEF DESCRIPTION OF THE DRAWINGS

The invention will be understood better and other advantages will come out from reading the following description, given by way of nonlimiting examples in association with the accompanying figures in which.

DESCRIPTION OF THE PREFERRED EMBODIMENT

Various geometries can be used to produce high power lasers according to the invention, they are preferably of plate or rod or tubular type. The active material preferably has a base of glass or crystals doped with rare earth ions ($Nd^{3+}$ for example).

Figure 1:
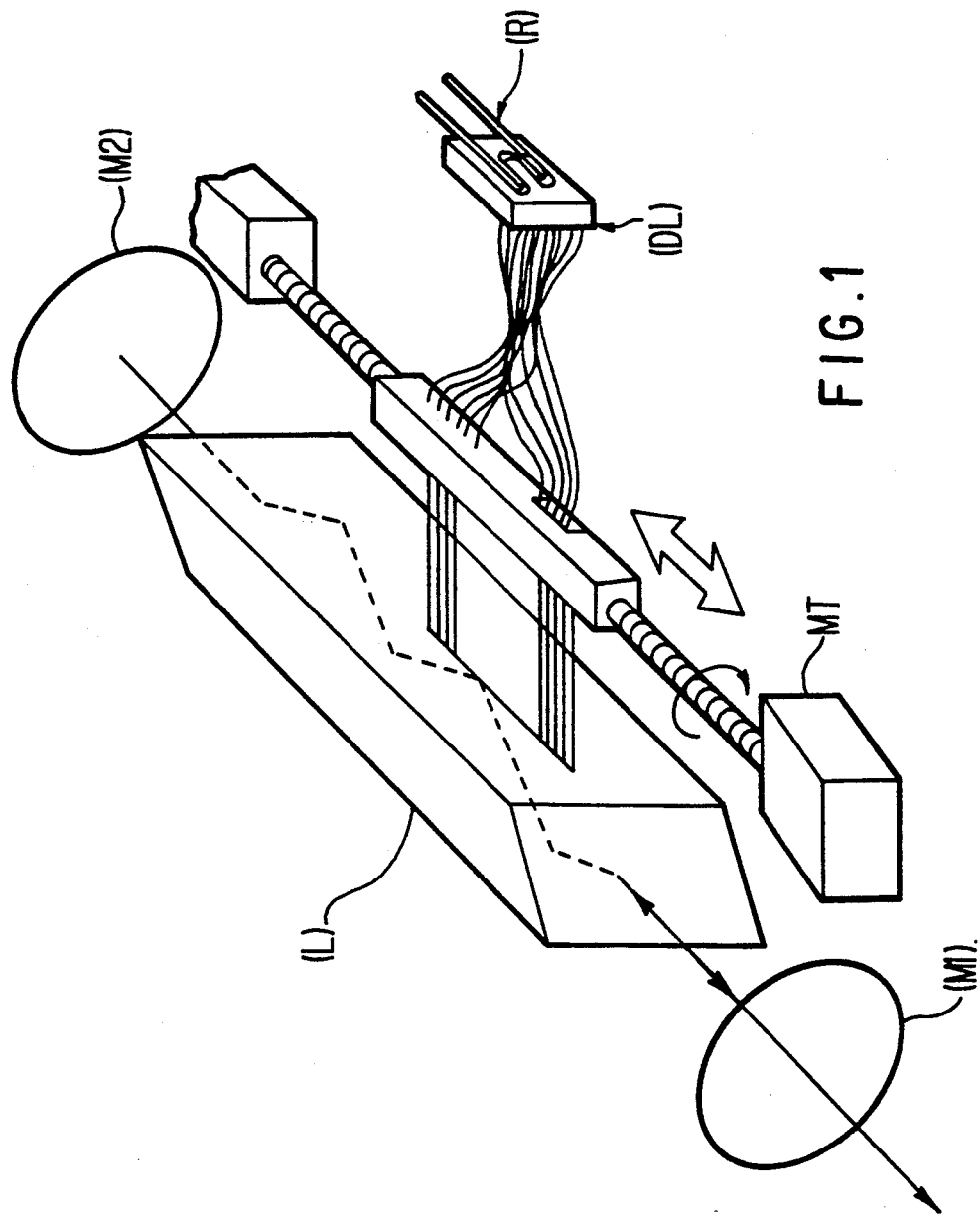
FIG. 1 represents the pumping device according to the invention of a solid-state laser having a plate geometry.

FIG. 1 shows an embodiment of the invention having a plate geometry. The active media is placed in a resonant cavity preferably consisting of two mirrors (M1) and (M2) perpendicular to the axis of the rod or of laser plate (L), as shown in FIG. 1. The mirrors are located on both sides of the laser material. At least one of the two mirrors is semi-transparent so that efficient amplification of incident radiation may occur. The mirrors may be terminal faces of the active media.

For plate geometry, optical fibers (F) connected to the optical pumping sources are brought to the surface or surfaces of the plate and can be driven mechanically by a longitudinal displacement relative to the axis of the laser cavity through use of a motor $M_T$. The displacement velocity of the pumping energy is adjusted in accordance with the thermal time constant of the material of the active media in order to maintain a homogeneous temperature in the active media.

The zone illuminated by the bundle of fibers may be illuminated for a sufficiently brief period in order to minimize temperature effects in the active media, such as a rod. The same zone is again illuminated (after a back and forth displacement of the beam) only at the end of a time at least equal to the thermal time constant of the active material.

The thermal time constant Cth is the measurement of the speed of evacuation of heat produced in the material of the active media. It depends, of course, on the nature of the material and in particular on the specific heat, the thermal conductivity of the active media, and the nature of the heat exchange with the active media and a heat exchange media. Therefore sweeping of one face of the plate with a bundle of fibers whose surface of illumination and displacement velocity are suited to the thermal time constant of the active media may be performed.

Several different sweeping schemes are envisioned. The sweeping can be performed with a pump beam covering, in a single pass, an entire height of a plate of active media. Sweeping can be performed along successive strips of the active media so that the bundle of fibers covers only a part of the height of the plate in a single pass and successive strips are covered with each pass of the beam. Note that the high thermal time constant of a doped glass (relative to a doped crystal of the YAG type) requires more time before reilluminating a region.

FIG. 1 illustrates the invention in the case where a single bundle of fibers conveys the pumping energy. The thermal energy at the level of laser diodes (DL) can be dissipated with a radiator (R), thus guaranteeing a spectral stability of the laser emission. A heat-exchanging fluid allows partial evacuation of heat from the optically pumped laser surfaces. The optical pumping delivered preferably by laser diodes can attain a power of several tens of kw/cm$^2$.

Figure 2:
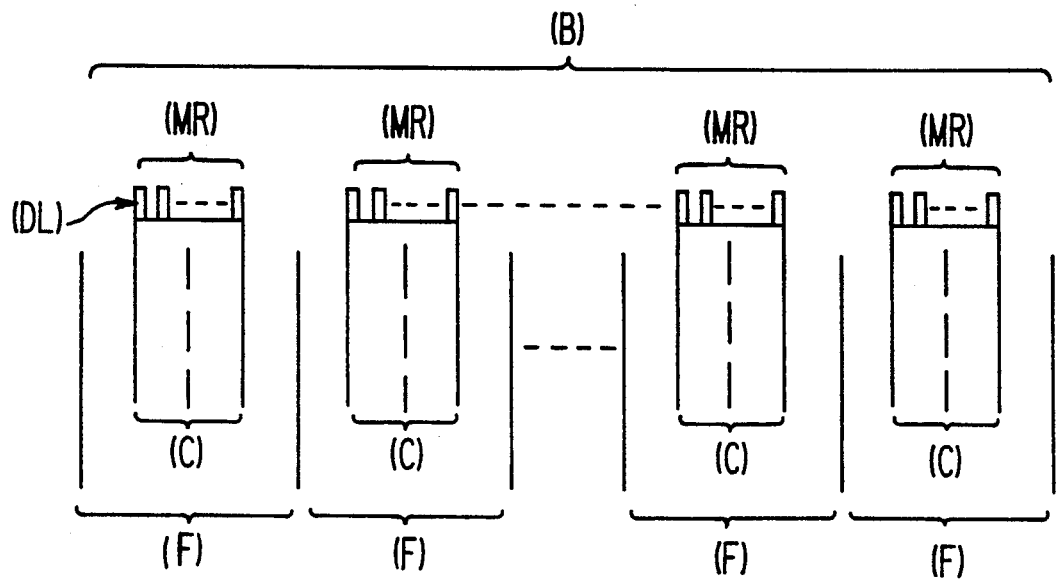
FIG. 2 represents a pumping source comprising laser diodes.

The optical pumping source may comprise bars (B) consisting of networks (MR) of multistrip diodes (DL). Typically, a network combines ten or so elementary diodes and exhibits a total width between 100 and 150 $\mu$m. It is therefore possible to use an optical fiber (F) with a diameter of core (C) of about 150 $\mu$m. The spacing between networks is on the order of 100 $\mu$m, as shown in FIG. 2.

A bar may contain between 20 and 30 networks of 10 strips. Therefore, it is possible to convey the energy emitted by a bar by bundles of fibers. For this purpose, it is possible to use a collective technique of prepositioning optical fibers relative to diode networks by chemical etching of V-shaped patterns in silicon. The association of a large number of bars thus makes it possible to produce a compact pumping source emitted from bundles of fibers.

Note that 1000 bars of laser diodes, each delivering 50 W continuously, generate a pump power of 50 kw. With a laser plate of doped glass $Nd^{3+}$ of dimensions $300 \times 6 \times 6$ mm$^3$, it is possible to obtain a laser power level with wavelength of 1.054 micron of 15 kw with an optical-optical pumping efficiency on the order of 30% from a pump energy of 50 kw with a wavelength of 0.808 micron. The laser power level depends on the coupling coefficient of the output mirror.

The laser plate has an optimal thickness linked to the absorption coefficient of the material at a pump wavelength of 0.808 micron, since the effectiveness of the pump energy decreases exponentially with increasing thickness.

Figure 3:
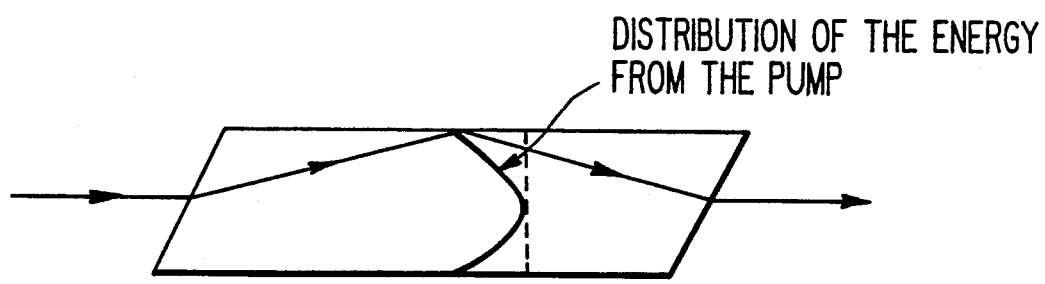
FIG. 3 represents a solid-state laser having a plate geometry and shows a course of the incident mode propagating in the laser.

FIG. 3 shows distribution of energy from the pump. In the case of a plate geometry, the optical orientation of the mode of the light beam to be amplified is preferably a zigzag mode. A better covering of the mode and of the most intensely pumped zones is thus obtained, as illustrated in FIG. 3. The ends of the plate are beveled with a beveling angle defined according to the Brewster condition to assure a total reflection inside the plate and to minimize losses in the reflection on the interface.

Figure 4A:
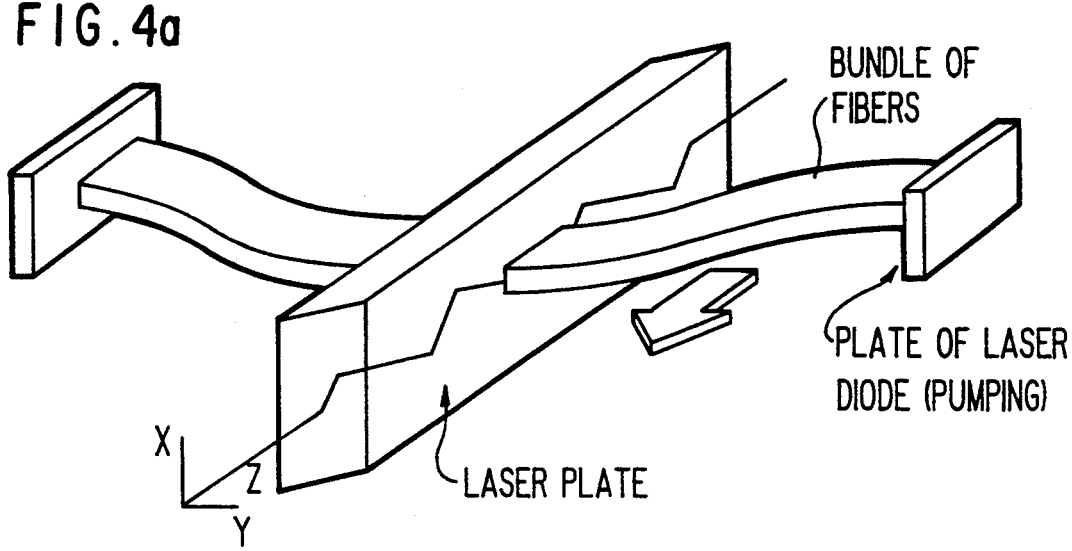
FIG. 4a shows a plate geometry laser in which a pumping device provides a source of optical pumping to each major face of the laser plate.
Figure 4B:
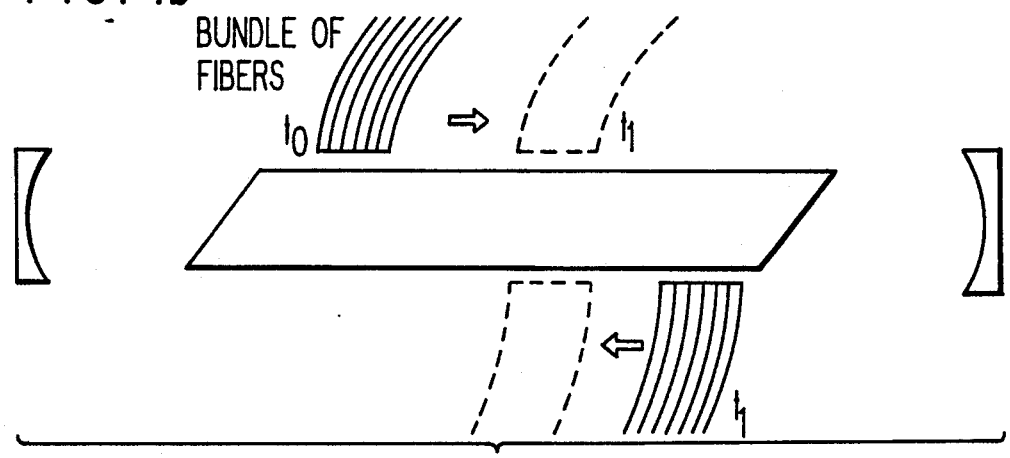
FIG. 4b shows positions of the optical fibers at various moments.
Figure 4C:
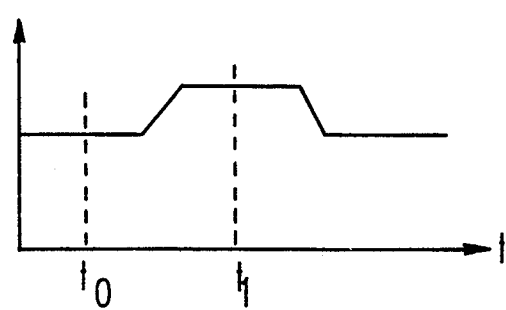
FIG. 4c shows the population inversion profile as a function of time at a given location of the plate.

FIG. 4a shows bundles of fibers and a plate of laser diodes. FIG. 4b shows displacement of upper and lower fiber bundles with respect to one another. FIG. 4c shows the population inversion at a particular position in an active media as a function of time during an interval when a bundle of optical fibers is swept past the position. Several optical pumping sources may be coupled to the laser medium by several bundles of fibers. A coupling of the pump to the laser medium by bundles of fibers that direct light into both major faces of a plate media, is shown in FIG. 4b. FIG. 4b also shows a displacement of the upper and lower pump beams.

If two pump beams are counterpropagating where the displacements of the two beams occur in reverse direction, it is possible to deliver a laser power that can be modulated depending on whether there is a spatial superposition of the two pump beams. Such counterpropagating beams may be provided by pump inputs to both major faces of a plate geometry laser media.

Figure 5:
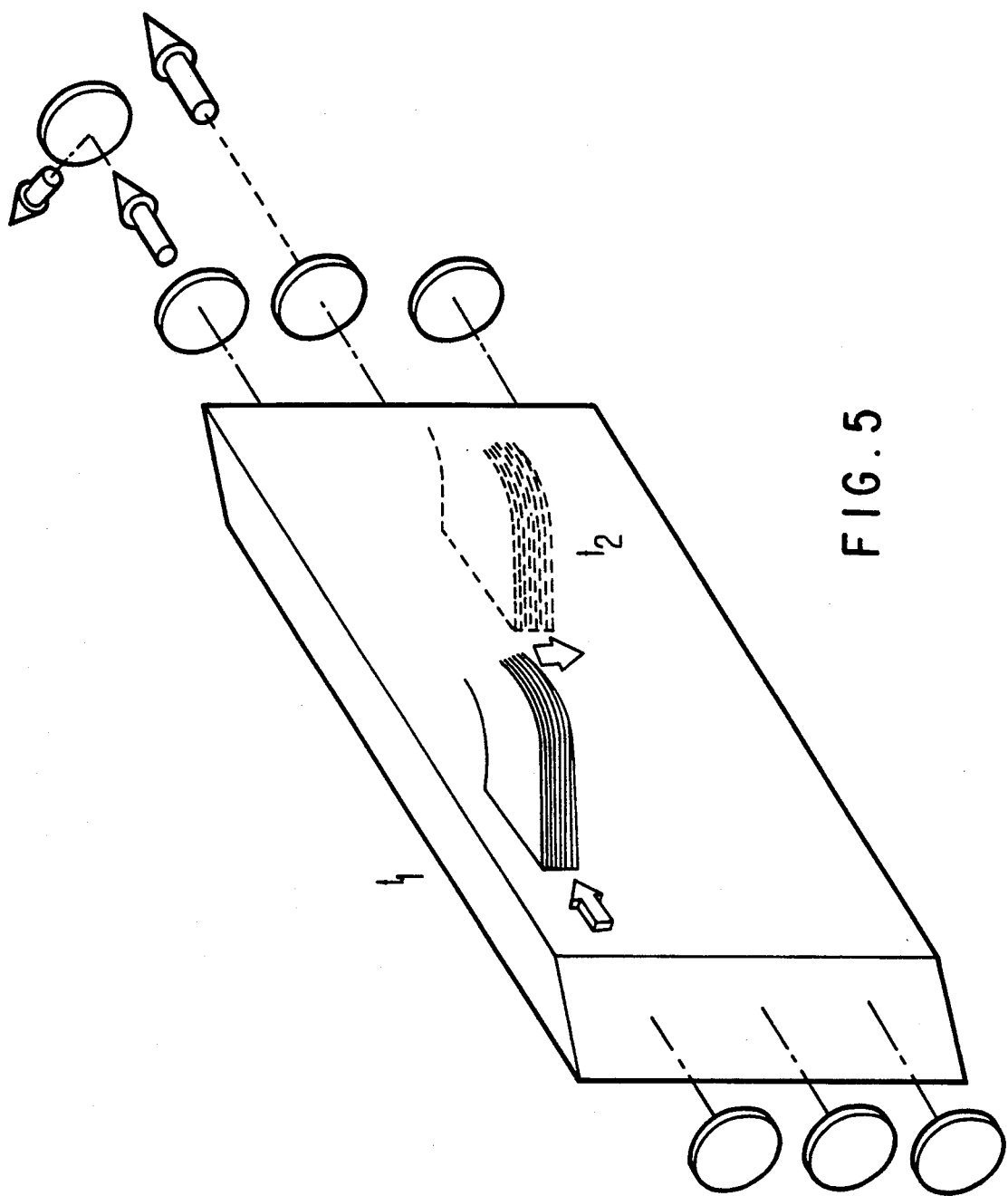
FIG. 5 represents a laser plate pumped with several optical programmable pumping sources that can be programmed over time.

Multiple optical resonators may be provided in a single laser plate by pumping locally with spatial multiplexing, as shown in FIG. 5. This structure makes it possible to have several stationary laser beams (cavities) pumped at different moments by displacement of the pump along the plate. Several mirrors placed at different positions define several resonant cavities that can be excited independently of one another. This configuration allows a single work station of a group of beams that can be assigned to specific tasks by controlling, for example, the pumping level (determined by the injection current in the laser diodes). Thus, the cost of a chain of industrial lasers can be minimized.

This mobile pumping concept can be extended to optical amplification stages. The displacement of the bundle of fibers according to the height of the plate can be coupled to a displacement in length along the axis of the cavity.

In another structure, it is possible to provide several cavities superposed according to the height of the plate and several groups of optical fibers each corresponding to a respective optical coupling surface, the coupling surfaces each being associated with a respective cavity to constitute several laser beams that can be activated individually.

Figure 6:
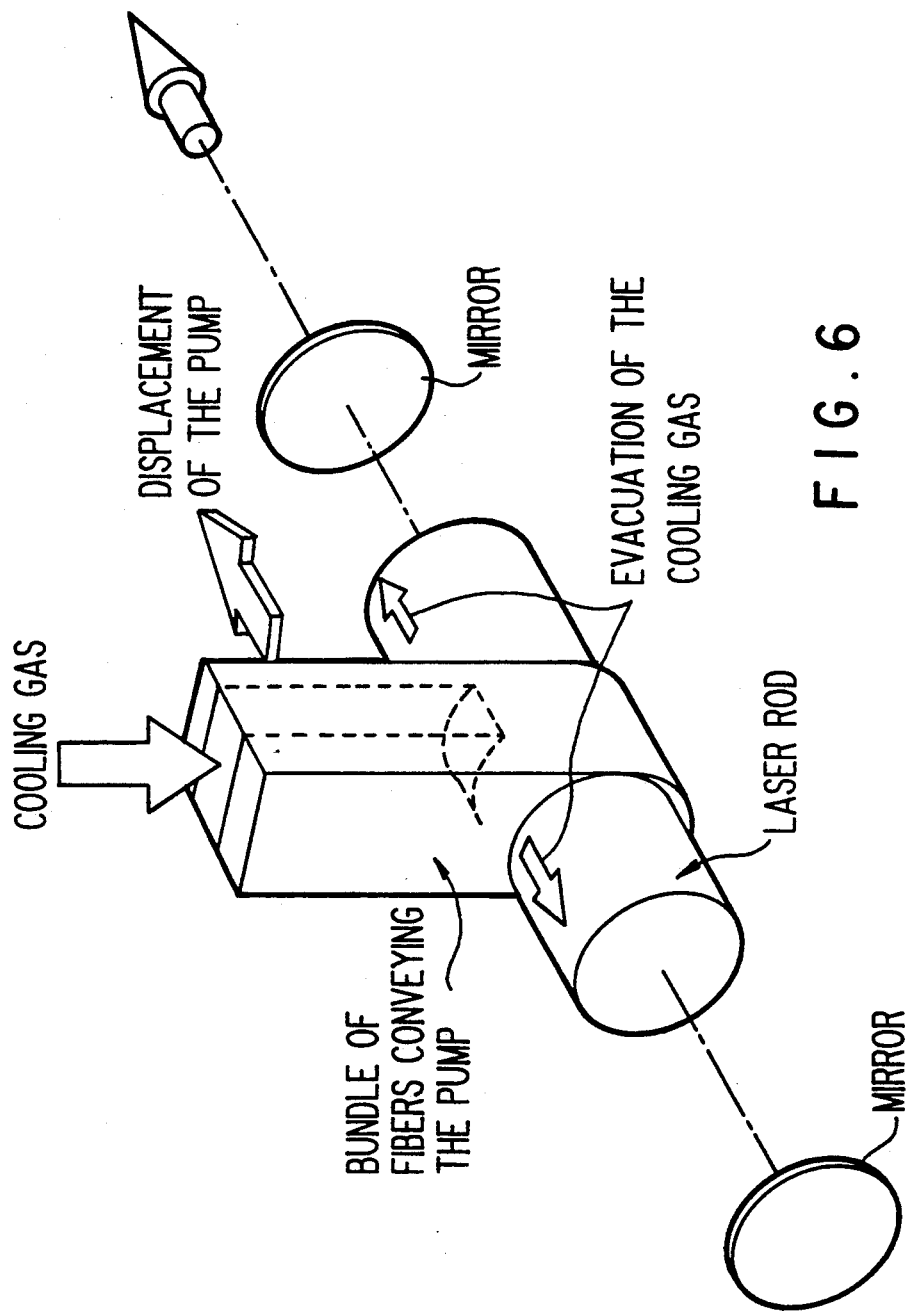
FIG. 6 shows a cylindrical solid-state laser structure, its optical pumping mode and the circulation of cooling gas.

A cylindrical structure can also produce advantageous devices. In this configuration of the laser medium, the pump can consist of a layer of optical fibers placed in a ring around the cylinder with longitudinal displacement of the bundle of fibers relative to the cylinder, as shown in FIG. 6. This allows insertion of a cooling fluid in the middle of the bundle of fibers to achieve a thermal exchange by crosswise convection from all the laser material.

The ends of optical fibers may be coupled to the outer surface of the plate or rod and distributed over a wide portion or over the entire surface. The optical fibers may be displaced so that the fibers oscillate around their resting points. This method only requires very small mechanical displacement and provides a displacement of the optical pumping zone of each fiber. Therefore, the evacuation of heat is promoted by avoiding pumping always at the same location.

For example, if there are 100 fibers distributed over 1 cm$^2$, the ends of fibers are spaced by 1 millimeter and a mechanical displacement of up to 0.5 mm will not pump the same positions. Therefore, oscillation of the fibers about their rest position by up to 0.5 mm is nonrepetitive and will enhance thermal uniformity of the laser.

We claim:

1. A high energy laser, comprising:
   a solid active medium having an outer surface;
   an optical pumping device, wherein at least one group of optical fibers is coupled to optical pumping sources so that first ends of the at least one group of optical fibers receives light from the optical pumping sources and the at least one group of optical fibers is coupled to the solid active medium so that light received by the optical fibers from the optical pumping sources is transmitted through the fibers, and propagates out of second ends of the fibers at second ends thereof as a first optical beam toward the solid active medium,
   wherein the first optical beam propagating out of the second ends is coupled into the solid active medium through a coupling surface of the solid active medium and at any given time, the coupling surface is only a portion of the outer surface of the active medium; and
   displacement means for displacing the second ends, thereby changing that portion of the outer surface which is the coupling surface.

2. Laser according to claim 1, wherein:
   the optical pumping sources are laser diodes.

3. Laser according to claim 2, wherein:
   the optical pumping sources comprise bars composed of networks of multistrip diodes, each network being coupled to an optical fiber and the pumping energy being conveyed by the group of fibers.

4. Laser according to claim 1, wherein:
   the solid active medium has a plate geometry; and
   wherein said displacement means provides means for displacing bundles of fibers longitudinally relative to a axis of a cavity containing the active medium.

5. A laser according to claim 4, further comprising:
   means for cooling the outer surface, comprising means for blowing a cooling fluid toward the solid active medium, wherein said displacement means moves said means for blowing along with said second ends so that said means for blowing blows cooling fluid toward the coupling surface.

6. A device according to claim 5, wherein:
   the means for blowing comprises a channel through which cooling fluid is to be blown, a first channel end of the channel is positioned to blow cooling fluid at the outer surface, said at least one group of optical fibers have portions including their second ends which are adjacent to and connected to the first channel end so that the first channel end and the second ends of the at least one group of optical fibers are displaced together by the displacement means.

7. Laser according to claim 1, wherein:
   the solid active medium has a cylindrical geometry; and
   wherein the optical pumping source comprises a layer of optical fibers disposed in a ring around the cylinder and the displacement means providing means for longitudinal displacement of the optical fibers relative to the cylinder.

8. Laser according to claim 7, wherein:
   a cooling fluid is inserted in the middle of the bundle of fibers, generating a thermal exchange by convection from the laser material.

9. Laser according to claim 1, wherein:
   the displacement means comprises means for displacing the second ends thereby displacing the coupling surface in a direction that is perpendicular to an optical propagation axis of a cavity intersecting the solid active medium.

10. Laser according to claim 9, wherein:
    several superposed resonant cavities exist along the height of the active medium; and means for selectively exciting distinct laser beams by changing the coupling surface through displacement of the second ends to selectively couple to at least one of the several superposed cavities, thereby providing several distinct laser beams that can be activated individually.

11. Laser according to claim 1, wherein:

several superposed resonant cavities are defined along a height of the active medium; and wherein several groups of optical fibers are provided, each group corresponding to an optical coupling surface and a resonant cavity, thereby comprising several laser beams that can be independently activated.

12. A device according to claim 1, wherein: the displacement means comprises a motor for rotating a shaft and means for converting rotary motion of the shaft into linear motion of the second ends.

13. A device according to claim 1, further comprising:

a second group of optical fibers which are coupled to said solid active medium so that they shine a second beam of light produced by a second optical pumping source toward a second coupling surface of said solid active medium; and means for modulating an intensity of the laser by simultaneously superposing and counter propagating portions of the first and second beams in the active medium.

* * * * *